July 2, 1963  M. GOLDMAN  3,095,852

FISH FEEDER

Filed Sept. 8, 1961

INVENTOR.
MARVIN GOLDMAN
BY
Friedman & Goodman
ATTORNEYS 3,095,852
FISH FEEDER
Marvin Goldman, Brooklyn, N.Y., assignor to Gro-wel Fish-Ade Co., Inc., a corporation of New York
Filed Sept. 8, 1961, Ser. No. 136,756
5 Claims. (Cl. 119—3)

The present invention relates to aquarium and fish tank apparatus and more specifically to regulatory means for feeding the fish therein and for keeping Tubifex worms alive.

The invention is particularly utile for home use, where pet fish such as gold fish or tropical fish are maintained. Such fish are frequently fed a reddish or brownish slender worm known as Tubifex. These are fresh water worms about one to one and one-quarter inches in length, and no thicker than an ordinary thread. When the worms are separated from the bottoms of polluted streams which is their natural habitat and placed in a container of fresh water separated from the mud, they aggregate and wind about one another into clumps or clusters to form a semi-solid ball or mass.

The Tubifex are fed to the fish alive, and are extremely beneficial thereto, and tend to keep the fish in a fine and healthy state, when introduced into the aquarium in the proper quantity. However, caution must be exercised in the feeding process. If an excess of Tubifex are introduced into the aquarium, those which the fish do not eat fall to the bottom of the aquarium and bury into the sand becoming inaccessible to the fish. Often-times the worms, after an extended period of time, will die and tend to pollute the aquarium water.

It is thus apparent that it is essential to keep the worms alive and accessible for feeding to the fish. Heretofore, the practice has been generally to keep the Tubifex under refrigeration in a vessel with a little water, and to take a roughly estimated quantity by hand, and simply drop it into the tank. An alternate method of keeping them alive heretofore has been by placing the worms in a vessel of water with fresh water continually running in and out of the vessel. The difficulty with this method is that such water usually contains chlorine and this has a deleterious effect upon the worms. If the Tubifex are kept under refrigeration, they normally have nothing to subsist upon and consequently cannot survive. If the quantity dropped into the aquarium tank is not correctly estimated, the excess over the amount required by fish swim off and bury themselves into the sand or in other recesses of the aquarium where they become inaccessible to the fish. As heretofore indicated, such excess of worms often die within the aquarium and consequently pollute the water.

Still another method of feeding the fish has been to place the worms on a species of sieve floating on the aquarium surface. The worms then wiggle their way through the sieve into the aquarium, but more frequently the fish come up to the surface and pull them out through the sieve. Manifestly, this method of feeding is disorderly and disorganized, for after the fish have had their fill, it permits the unwanted worms to penetrate into the tank and contaminate and pollute the water as heretofore explained.

The present invention contemplates the elimination of the foregoing disadvantages, by the provision of a tray-like device adaptable to be secured to a wall of the aquarium at the water level thereof, said device being substantially divided into a reservoir compartment for the Tubifex and a strainer compartment communicating with the revervoir, and embodying means for continuously circulating a gentle stream of infusorial laden and oxygenated water drawn from the aquarium, through the reservoir compartment into the strainer, such that a regulated quantity of worms is constantly carried by the turbulence into the tank depending upon the intensity of the stream. In this manner means are also provided for keeping the Tubifex constantly alive by the incessant beneficial contact with the oxygenated aquarium water which is also rich in infusoria and microscopic organisms as hereinafter more specifically explained.

Weak worms are first separated from the mass and introduced into the aquarium water while they are still viable.

Accordingly, it is one of the objects of the present invention to provide a device for feeding Tubifex to fish in an aquarium tank whereby the foregoing disadvantages are eliminated, and to do so in a novel and effective manner.

Another object of the invention is to provide a device of the above indicated nature embodying means for keeping the Tubifex alive and prolonging their longevity.

Still another object of the invention is to provide a device for feeding Tubifex to fish in an aquarium tank which shall insure that a continuous and regulated quantity of worms is introduced into the aquarium as desired.

Another object of the invention is to provide a fish feeding device of the above indicated nature which shall be relatively inexpensive yet positive and reliable in operation.

Still another object is to provide a device of the nature above indicated, which shall be sturdy and durable, yet inexpensive to operate and maintain.

Other objects and advantages shall appear more fully hereinafter by a consideration of the detailed description which follows, taken together with the accompanying drawing. It is to be expressly understood however that the drawing is for the purposes of illustration only and is not to be construed as defining the limits of the invention, reference being had for that purpose to the appended claims.

In the drawing, wherein like reference characters indicate like parts:

Figure 3:
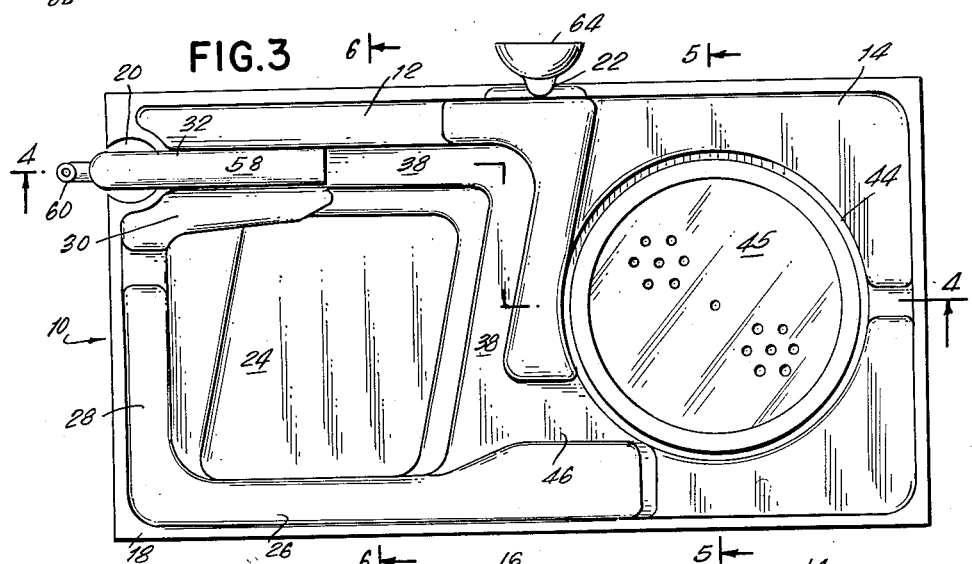
FIGURE 3 is an enlarged plan view of the novel fish feeding device.

Referring now to the drawing, and more particularly to FIGURE 3, there is shown a tray-like fish feeder generally designated by the numeral 10. The feeder 10 is rectangularly constructed in the preferred form of the invention from a plastic composition material which permits easy moulding of the various ribs and contours thereof, and yet is sturdy and durable, and resistant to corrosion which might occur as a result of constant contact with water. The feeder is essentially divided into a reservoir portion 12, and a strainer portion 14 by a moulded intermediate wall 16 of inverted channel form extending substantially across the feeder. A flange 18, for stiffening purposes extends about the entire exterior periphery of the feeder and contains therein a pair of annular slotted recesses or slots 20 and 22, for reasons hereinafter explained.

The reservoir portion 12 is substantially dish-form and is defined by a floor 24 (FIGURES 3 and 6) encompassed on three sides by vertical walls 26, 28, and 30, and on the fourth side by the intermediate wall 16, insofar as it extends across the feeder 10. The walls 26 and 28 rise vertically from the flange 18, and for stiffening purposes are in the form of an inverted channel section with the interior leg of the channel extending vertically downward to join with the floor 24 of the reservoir portion 12.

The wall 30 on the other hand extends from one side of the annular slot 20 only part way along its side of the floor 24, and forms a trough 32 of approximately the same width as the slot 20 with a parallel outer wall 34 which extends the entire length of the reservoir section and culminates in intersecting relation with the intermediate wall 16. The bottom 36 of the trough 32 extends beyond the end of the wall 30 and continues to form a shoulder 38 along the base of the outer wall 34 (FIGURE 3) which shoulder in turn continues along the foot of the intermediate wall 16 and continues beyond the end of said wall 30 to the foot of the wall 26.

Directing attention now to the strainer portion 14 (FIGURES 3 and 5), there is shown a recess 40 encompassed within a vertical wall 42. The recess 40 is open, having a hole 44 of the same size and contour as the recess through the bottom thereof. While the recess is herein shown as annular in contour, it is understood that any other form or contour may be employed to equal advantage. A strainer 45 of any prescribed type, and having a plurality of holes therein of sufficient diameter to permit the Tubifex worms to pass therethrough is placed in the hole 44 and secured in place in any approved manner, such as by reposing on a flange 47 about the hole 44 as shown (FIGURE 5).

Figures 4, 5, 6:
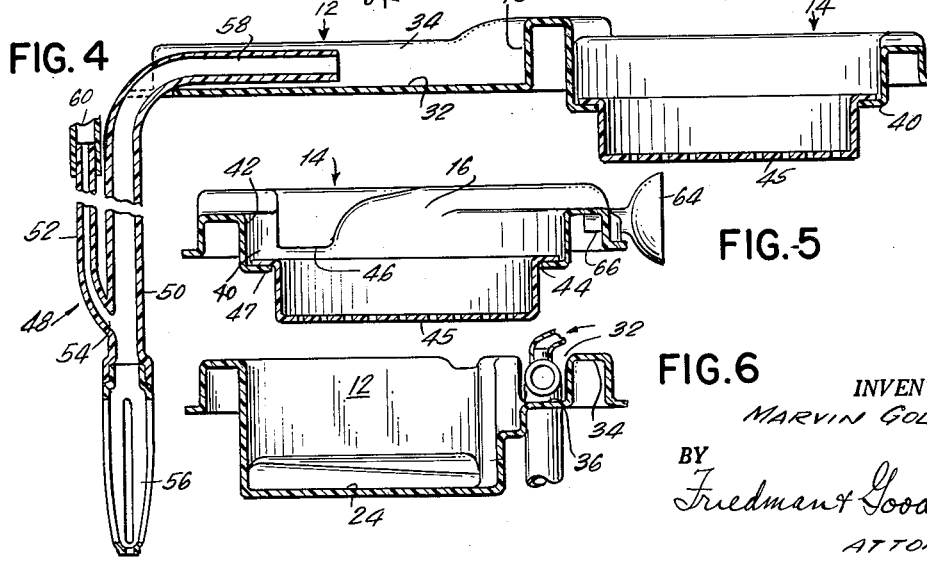
FIGURE 4 is an elevation view in section taken along the line 4—4 of FIGURE 3 and looking in the direction of the arrows.
FIGURE 5 is a section view taken along the line 5—5 of FIGURE 3 and looking in the direction of the arrows.
FIGURE 6 is a section view taken along the line 6—6 of FIGURE 3 and looking in the direction of the arrows.

As heretofore stated, the intermediate wall 16 does not extend entirely across the feeder 10, but stops short of the wall 26 to form a passageway 46 therebetween at the level of the shoulder 38 (FIGURES 3 and 5). Thus, the passageway 46 provides the sole communication between the reservoir portion 12, an dthe strainer portion 14.

Referring now to FIGURE 4, there is shown an air stem assembly 48 of the type commonly known in the art, wherein a tube 50 is provided with an air hose 52 connected on one end therewith, as at a juncture 54. The tube 50 is further provided with a perforated straight lower end 56 adapted to extend into a water tank or aquarium (FIGURE 2) and a top end 58 curving off to approximately a right angle, and adapted to be received by the annular slot 20 and to snuggle firmly into the trough 32. Thus, by attaching the opposite end 60 of the air hose 52 to a pump (not shown here) the air pressure through the hose 52 will produce a suction on the end 56 of the tube 50 and thus lift water from the tank through the perforations therein, the water passing upward through the tube 50 and out of the curved end 58 into the trough 32.

Figure 2:
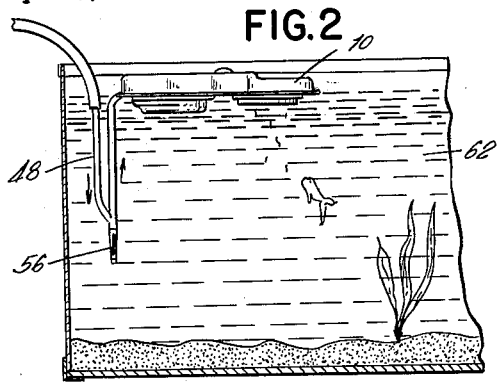
FIGURE 2 is an elevation view of FIGURE 1.

To attach the feeder 10 to a tank or aquarium 62, there is employed a suction cup 64 having a stem 66 wedged firmly into the annular slot 22 (FIGURE 5). The suction cup 64 is flattened against a wall of the aquarium at a point such that the entire feeder assembly 10 is above the level of the water, as shown in FIGURE 2, and the suction force suffices to hold the feeder 10 firmly in place.

Figure 1:
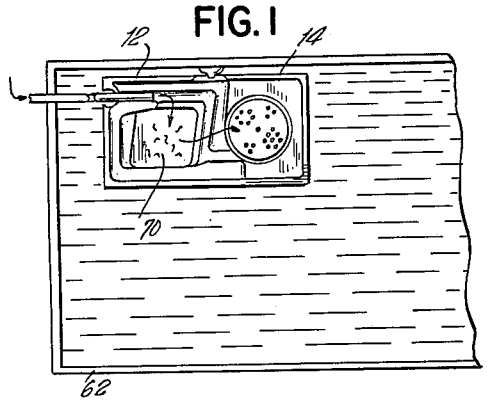
FIGURE 1 is a plan view of a fish tank or aquarium with the novel fish feeding device installed therein.

Having thus described the invention, in operation it will now be apparent to those skilled in the art that when a quantity of Tubifex 70 is placed on the floor 24 of the reservoir portion 12, as in FIGURE 1, and the end of the air hose 60 is connected to an operative air pump, water will flow in a stream from the top end 58 into the trough 32 and into the dish-shaped reservoir portion 12, thereby passing over and about the Tubifex. Upon reaching the level of the shoulder 38 the water stream will overflow through the passageway 46 into the strainer section 12, and through the perforations in the strainer 45, back into the aquarium 62.

The Tubifex, as heretofore stated, is entwined and wound about one another into clumps or clusters. As the stream gently passes thereover, some of the worms are loosened and disentangled from the mass or clump, whence they are carried by the stream into the strainer portion 14 and into the strainer 45 from which they then pass through the strainer perforations into the aquarium 62 to provide feed for the fish.

It will be noted that the bulk of the Tubifex which are in the reservoir compartment, are thus subjected to a gentle stream of water drawn from the aquarium running over them continuously. The aquarium water has a very beneficial effect upon the Tubifex, firstly because it is oxygenated, and secondly because it is rich in infusoria and a variety of microscopic organisms, plant as well as animal, which the Tubifex feed upon and are sustained thereby. In this manner their longevity is prolonged.

By the foregoing means it is possible to feed the fish in a more orderly and organized manner, since the quantity of Tubifex permitted to pass into the aquarium can readily be regulated by regulating the quantity flow and velocity of the stream. This is readily accomplished by known and simple pump control techniques.

While only one embodiment of the invention has been illustrated and described, it is apparent that changes and modifications such as may occur to those skilled in the art, may be made without departing from the spirit and scope of the invention.

What is claimed is:
1. In a device for feeding fish in an aquarium, the combination comprising, a substantially dish form reservoir, a trough leading from the exterior of the device into said reservoir, a strainer portion including an opening at the bottom thereof communicating with the aquarium, a strainer supported in said opening, an intermediate wall separating said reservoir and strainer portion, passageway means communicating between said reservoir and strainer portion, and means on said device for supporting the same on the aquarium.

2. A device for feeding fish in an aquarium according to claim 1, wherein said strainer portion is recessed and defined by a vertical annular wall.

3. A device for feeding fish in an aquarium according to claim 1 wherein the dish form reservoir is defined by a floor encompassed by vertical walls in the form of inverted channel section rising therefrom, and a stiffening flange extends about the entire periphery of the device.

4. In a device for feeding fish in an aquarium, the combination comprising, a substantially dish form reservoir, a trough leading from the exterior of the device into said reservoir, a strainer portion including an opening at the bottom thereof communicating with the aquarium, a strainer supported in said opening, an intermediate wall separating said reservoir and strainer portion, passageway means communicating between said reservoir and strainer portion, means on said device for supporting the same on the aquarium, and means for pumping water into said trough.

5. In a device for feeding fish in an aquarium, the combination comprising, a substantially dish form reservoir, a trough leading from the exterior of the device into said reservoir, a strainer portion including an opening at the bottom thereof communicating with the aquarium, a strainer supported in said opening, an intermediate wall separating said reservoir and strainer portion, passageway means communicating between said reservoir and strainer portion, means on said device for supporting the same on the aquarium, and means for elevating water from the aquarium into the feeding device.

References Cited in the file of this patent
UNITED STATES PATENTS

| | | |
|---|---|---|
| 2,665,250 | Willinger et al. | Jan. 5, 1954 |
| 2,711,714 | Timeus | June 28, 1955 |
| 2,718,211 | Pettas | Sept. 20, 1955 |
| 2,981,228 | Brandano | Apr. 25, 1961 |
| 2,990,808 | Rumonski | July 4, 1961 |